US012669069B2

(12) United States Patent
Binek et al.

(10) Patent No.: US 12,669,069 B2
(45) Date of Patent: *Jun. 30, 2026

(54) BEARING CHAMBER WITH MAPPED THERMAL HEAT EXCHANGE FINS

(71) Applicant: RTX Corporation, Farmington, CT (US)

(72) Inventors: Lawrence A. Binek, Glastonbury, CT (US); Christopher D. Ramsey, Glastonbury, CT (US); Gen Satoh, Cheshire, CT (US); Benjamin G. Gardell, Bristol, CT (US)

(73) Assignee: RTX CORPORATION, Farmington, CT (US)

( * ) Notice: Subject to any disclaimer, the term of this patent is extended or adjusted under 35 U.S.C. 154(b) by 196 days.

This patent is subject to a terminal disclaimer.

(21) Appl. No.: 18/387,564

(22) Filed: Nov. 7, 2023

(65) Prior Publication Data

US 2024/0151155 A1     May 9, 2024

Related U.S. Application Data

(60) Provisional application No. 63/423,387, filed on Nov. 7, 2022.

(51) Int. Cl.
F01D 25/12 (2006.01)
B33Y 50/00 (2015.01)
(Continued)

(52) U.S. Cl.
CPC ............ F01D 25/125 (2013.01); B33Y 50/00 (2014.12); B33Y 80/00 (2014.12); F01D 25/162 (2013.01);
(Continued)

(58) Field of Classification Search
CPC ........ F02C 7/06; F01D 25/125; F01D 25/162; F01D 25/164; F01D 25/18; F16C 37/007;
(Continued)

(56) References Cited

U.S. PATENT DOCUMENTS

| | | | | |
|---|---|---|---|---|
| 8,470,234 B2 * | 6/2013 | Clark | ...................... | B22F 10/47 264/109 |
| 9,234,439 B2 * | 1/2016 | Demitraszek, Sr. | .... | F01D 25/16 |

(Continued)

FOREIGN PATENT DOCUMENTS

| | | | | |
|---|---|---|---|---|
| CN | 112032613 A | * | 12/2020 | ............ F21V 29/507 |
| EP | 1878522 B1 | * | 2/2012 | ............. B22F 5/009 |

(Continued)

OTHER PUBLICATIONS

Search Report issued in European Patent Application No. 23208368. 3; Application Filing Date Nov. 7, 2023; Date of Mailing Mar. 28, 2024 (8 pages).

(Continued)

*Primary Examiner* — Topaz L. Elliott

(74) *Attorney, Agent, or Firm* — CANTOR COLBURN LLP

(57) ABSTRACT

A method of additively manufacturing a component is provided. The method includes generating a three-dimensional (3D) model of the component, generating a first heat map of the 3D model which is illustrative of first thermal effects the component is expected to experience during additive manufacturing, generating a second heat map of the 3D model which is illustrative of second thermal effects the component is expected to experience during operational use, updating the 3D model to include 3D heat exchange fin models for reducing each of the first and second thermal effects and updating the 3D model with the 3D heat exchange fin models to include 3D weight reduction cavity (Continued)

models for weight-neutralizing the 3D heat exchange fin models.

16 Claims, 5 Drawing Sheets

(51) Int. Cl.
  *B33Y 80/00* (2015.01)
  *F01D 25/16* (2006.01)
  *F16C 37/00* (2006.01)
(52) U.S. Cl.
  CPC .......... *F16C 37/00* (2013.01); *F05D 2230/31* (2013.01); *F05D 2260/22141* (2013.01); *F16C 2360/23* (2013.01)
(58) Field of Classification Search
  CPC ......... B33Y 80/00; B33Y 10/00; B33Y 50/02; B33Y 99/00
  See application file for complete search history.

(56) References Cited

U.S. PATENT DOCUMENTS

| | | | | |
|---|---|---|---|---|
| 9,828,874 | B2 * | 11/2017 | Grelin | F01D 25/16 |
| 9,879,750 | B2 * | 1/2018 | Husband | B33Y 80/00 |
| 10,968,774 | B2 | 4/2021 | Theratil et al. | |
| 11,103,927 | B2 | 8/2021 | Tang et al. | |
| 11,168,605 | B2 | 11/2021 | Hoag et al. | |
| 11,230,061 | B2 | 1/2022 | Mirabella et al. | |
| 11,434,772 | B2 * | 9/2022 | Griffis | B22F 10/28 |
| 2009/0039570 | A1 * | 2/2009 | Clark | B29C 64/153 |
| | | | | 264/653 |
| 2014/0119913 | A1 | 5/2014 | Demitraszek, Sr. et al. | |
| 2015/0139784 | A1 * | 5/2015 | Grelin | F01D 9/065 |
| | | | | 384/462 |

| | | | | |
|---|---|---|---|---|
| 2016/0243620 | A1 * | 8/2016 | Butcher | B23K 15/0086 |
| 2017/0248191 | A1 | 8/2017 | Husband et al. | |
| 2018/0106157 | A1 * | 4/2018 | Kovacik | F16J 15/4476 |
| 2019/0203660 | A1 * | 7/2019 | Hesselink | F02G 1/0435 |
| 2019/0249569 | A1 * | 8/2019 | Stiehler | F01D 25/162 |
| 2020/0109646 | A1 * | 4/2020 | Black | F16C 33/6685 |
| 2020/0116047 | A1 * | 4/2020 | Theratil | F01D 25/183 |
| 2020/0173496 | A1 * | 6/2020 | Wild | F04D 29/5893 |
| 2020/0307174 | A1 * | 10/2020 | Woytowitz | B29C 64/393 |
| 2021/0033003 | A1 | 2/2021 | Ovaere et al. | |
| 2021/0162506 | A1 * | 6/2021 | Tang | B22F 10/43 |
| 2021/0189882 | A1 * | 6/2021 | Hayes | F02K 9/60 |
| 2021/0331433 | A1 | 10/2021 | Spalding et al. | |
| 2022/0088881 | A1 * | 3/2022 | Kim | B33Y 50/00 |
| 2022/0098992 | A1 * | 3/2022 | Griffis | F23R 3/42 |
| 2022/0275809 | A1 * | 9/2022 | Kobielski | F02B 37/00 |
| 2022/0284154 | A1 * | 9/2022 | Yavari | B22F 5/10 |
| 2023/0306160 | A1 * | 9/2023 | Mirzendehdel | G06F 30/23 |
| 2024/0135048 | A1 * | 4/2024 | McDaniel | G06F 30/15 |
| 2024/0151156 | A1 | 5/2024 | Binek et al. | |
| 2024/0151266 | A1 * | 5/2024 | Ramsey | F01D 25/164 |
| 2024/0403522 | A1 | 12/2024 | Ramakrishnan et al. | |
| 2025/0067197 | A1 * | 2/2025 | Hernandez | F01D 25/186 |

FOREIGN PATENT DOCUMENTS

| | | | | |
|---|---|---|---|---|
| RU | 2778985 C1 * | 8/2022 | | |
| WO | WO-2017170729 A1 * | 10/2017 | .......... | F04D 29/023 |

OTHER PUBLICATIONS

Search Report issued in European Patent Application No. 23208233.9; Application Filing Date Nov. 7, 2023; Date of Mailing Mar. 20, 2024 (8 pages).

* cited by examiner

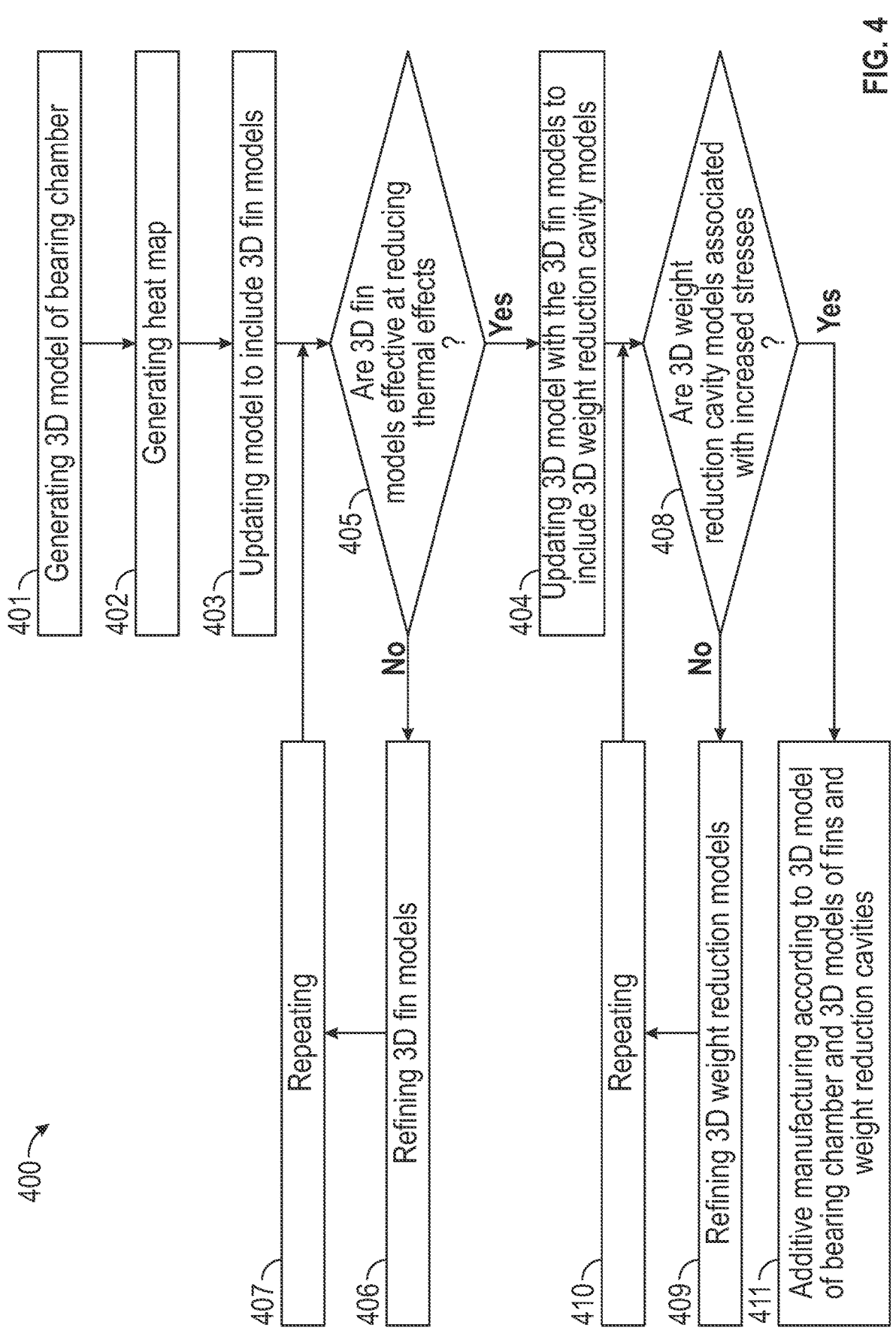

400

401 Generating 3D model of bearing chamber

402 Generating heat map

403 Updating model to include 3D fin models

405 Are 3D fin models effective at reducing thermal effects ?

Yes

404 Updating 3D model with the 3D fin models to include 3D weight reduction cavity models 408 Are 3D weight reduction cavity models associated with increased stresses ?

Yes

No

407 Repeating

406 Refining 3D fin models

No

410 Repeating

409 Refining 3D weight reduction models

411 Additive manufacturing according to 3D model of bearing chamber and 3D models of fins and weight reduction cavities

FIG. 4

BEARING CHAMBER WITH MAPPED THERMAL HEAT EXCHANGE FINS

CROSS-REFERENCE TO RELATED APPLICATIONS

This application claims the benefit of U.S. Provisional Application No. 63/423,387 filed Nov. 7, 2022, the disclosure of which is incorporated herein by reference in its entirety.

BACKGROUND

Exemplary embodiments of the present disclosure relate generally to gas turbine engines and, in one embodiment, to a bearing chamber with mapped thermal heat exchange fins.

In a gas turbine engine, air is compressed in a compressor and compressor air is then mixed with fuel and combusted in a combustor to produce a high-temperature and high-pressure working fluid. This working fluid is directed into a turbine in which the working fluid is expanded to generate power. The generated power drives the rotation of a rotor within the turbine through aerodynamic interactions between the working fluid and turbine blades or airfoils. The rotor can be used to drive rotations of a propeller or to produce electricity in a generator.

Additively manufactured components, such as a bearing chamber of a gas turbine engine, are susceptible to a significant amount of distortion and residual stress, particularly following various secondary processes such as, for example, a heating process. To avoid this, components can be modified to include thermal heat exchange fins, but this comes at a cost of added weight and complexity.

Accordingly, a need exists for an additively manufactured bearing chamber with mapped thermal heat exchange fins that does not add weight and complexity to the bearing chamber.

BRIEF DESCRIPTION

According to an aspect of the disclosure, method of additively manufacturing a component is provided. The method includes generating a three-dimensional (3D) model of the component, generating a first heat map of the 3D model which is illustrative of first thermal effects the component is expected to experience during additive manufacturing, generating a second heat map of the 3D model which is illustrative of second thermal effects the component is expected to experience during operational use, updating the 3D model to include 3D heat exchange fin models for reducing each of the first and second thermal effects and updating the 3D model with the 3D heat exchange fin models to include 3D weight reduction cavity models for weight-neutralizing the 3D heat exchange fin models.

In accordance with additional or alternative embodiments, the component includes a bearing chamber.

In accordance with additional or alternative embodiments, the method further includes determining whether the 3D heat exchange fin models are effective at reducing the first and second thermal effects, refining the 3D heat exchange fin models based on a result of the determining and repeating the determining and the refining until the determining indicates that the 3D heat exchange fin models are effective at reducing the first and second thermal effects.

In accordance with additional or alternative embodiments, the method further includes determining whether the 3D weight reduction cavity models are associated with increased stresses, refining the 3D weight reduction cavity models based on a result of the determining and repeating the determining and the refining until the determining indicates that the 3D weight reduction cavity models are not associated with increased stresses.

In accordance with additional or alternative embodiments, the method further includes additively manufacturing the component according to the 3D model, the 3D heat exchange fin models and the 3D weight reduction cavity models.

In accordance with additional or alternative embodiments, the 3D heat exchange fin models are representative of fins integrally built on the component.

In accordance with additional or alternative embodiments, the 3D heat exchange fin models are representative of an array of surface features integrally built on the component.

In accordance with additional or alternative embodiments, the 3D heat exchange fin models are representative of an array of surface features integrally built on the component and configured to channel oil on a surface of the component.

According to an aspect of the disclosure, a method of additively manufacturing a bearing chamber is provided. The method includes generating a three-dimensional (3D) model of the bearing chamber, generating a heat map of the 3D model which is illustrative of first thermal effects the bearing chamber is expected to experience during additive manufacturing, generating a heat map of the 3D model which is illustrative of second thermal effects the bearing chamber is expected to experience during operational use, updating the 3D model to include 3D heat exchange fin models for reducing the first and second thermal effects and updating the 3D model with the 3D heat exchange fin models to include 3D weight reduction cavity models for weight-neutralizing the 3D heat exchange fin models.

In accordance with additional or alternative embodiments, the method further includes determining whether the 3D heat exchange fin models are effective at reducing the first and second thermal effects, refining the 3D heat exchange fin models based on a result of the determining and repeating the determining and the refining until the determining indicates that the 3D heat exchange fin models are effective at reducing the first and second thermal effects.

In accordance with additional or alternative embodiments, the method further includes determining whether the 3D weight reduction cavity models are associated with increased stresses, refining the 3D weight reduction cavity models based on a result of the determining and repeating the determining and the refining until the determining indicates that the 3D weight reduction cavity models are not associated with increased stresses.

In accordance with additional or alternative embodiments, the method further includes additively manufacturing the bearing chamber according to the 3D model, the 3D heat exchange fin models and the 3D weight reduction cavity models.

In accordance with additional or alternative embodiments, the 3D heat exchange fin models are representative of fins integrally built on a surface of the bearing chamber.

In accordance with additional or alternative embodiments, the 3D heat exchange fin models are representative of an array of surface features integrally built on a surface of the bearing chamber.

In accordance with additional or alternative embodiments, the 3D heat exchange fin models are representative of an array of surface features integrally built on a surface of the bearing chamber and configured to channel oil thereon.

According to an aspect of the disclosure, a bearing chamber is provided and includes a bearing chamber body and heat exchange fins integrally formed with the bearing chamber body to reduce first thermal effects the bearing chamber is expected to experience during additive manufacturing thereof and to reduce second thermal effects the bearing chamber is expected to experience during operational use thereof. The bearing chamber body defines weight reduction cavities for weight-neutralizing the heat exchange fins.

In accordance with additional or alternative embodiments, the heat exchange fins are integrally built on a surface of the bearing chamber.

In accordance with additional or alternative embodiments, the heat exchange fins are an array of surface features integrally built on a surface of the bearing chamber.

In accordance with additional or alternative embodiments, the heat exchange fins are an array of surface features integrally built on a surface of the bearing chamber and configured to channel oil thereon.

These and other advantages and features will become more apparent from the following description taken in conjunction with the drawings.

BRIEF DESCRIPTION OF THE DRAWINGS

The following descriptions should not be considered limiting in any way. With reference to the accompanying drawings, like elements are numbered alike:

FIG. 4 is a flow diagram illustrating a method of additively manufacturing a bearing chamber in accordance with embodiments.

These and other advantages and features will become more apparent from the following description taken in conjunction with the drawings.

DETAILED DESCRIPTION

A detailed description of one or more embodiments of the disclosed apparatus and method are presented herein by way of exemplification and not limitation with reference to the Figures.

Figure 1:
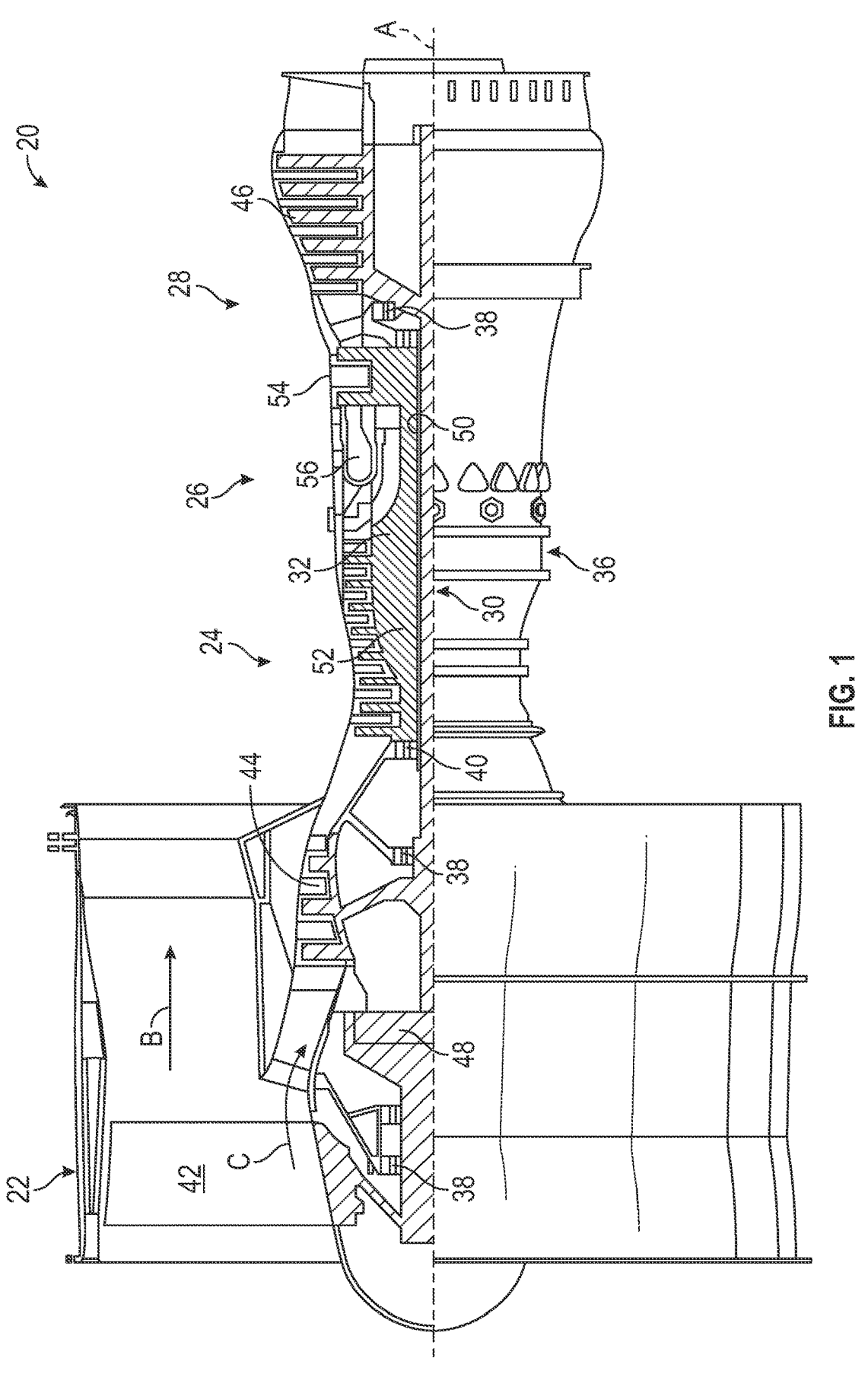
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 and then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary gas turbine engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in the gas turbine engine 20 between the high pressure compressor 52 and the high pressure turbine 54. The engine static structure 36 is arranged generally between the high pressure turbine 54 and the low pressure turbine 46. The engine static structure 36 further supports the bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 and then the high pressure compressor 52, is mixed and burned with fuel in the combustor 56 and is then expanded over the high pressure turbine 54 and the low pressure turbine 46. The high and low pressure turbines 54 and 46 rotationally drive the low speed spool 30 and the high speed spool 32, respectively, in response to the expansion. It will be appreciated that each of the positions of the fan section 22, compressor section 24, combustor section 26, turbine section 28, and fan drive gear system 48 may be varied. For example, geared architecture 48 may be located aft of the combustor section 26 or even aft of the turbine section 28, and the fan section 22 may be positioned forward or aft of the location of geared architecture 48.

Within the gas turbine engine 20, bearings are used to provide smooth relative rotation between the various shafts and non-rotating components and/or between two shafts which rotate at different speeds. An oil lubrication system can be provided that includes an oil pump, sometimes referred to as a main pump, and a network of conduits and nozzles to feed the bearings with oil. This oil is contained in bearing cavities, typically formed inside annular bearing chambers. A scavenge system having one or more scavenge lines extending from the bearing chambers and one or more scavenge pumps can be used to recover the oil, which can be in the form of an oil foam at that stage. Air/oil separation and filtering is typically provided for before returning the processed oil to the bearings.

In the bearing chambers, air and oil flows mix and generate a flow pattern about the engine central longitudinal axis A. The oil flow pattern generally operates as follows: Oil particles coalesce along internal bearing chamber partitions and form a liquid partition film which contains air bubbles. In the radial space between the rotating shaft and the liquid oil film, a mixture of air and dispersed oil particles swirl in a circumferential direction at a velocity greater than the liquid oil film flow along the partitions. As a result, the oil film flow is exposed to high shear stresses at the air/oil film interface. Film thickness and velocity distributions inside the bearing are driven by the magnitude of that interfacial shear and superimposed effects of gravitational forces.

To achieve bearing chamber functionality, air and oil flows are discharged to an oil scavenge system which communicates with the oil sump and which is partially formed within the bearing chamber.

As will be described below, an additively manufactured component, such as a bearing chamber, of the gas turbine engine 20 of FIG. 1 is provided. The component (hereinafter referred to as a "bearing chamber") is additively manufactured to include integrally formed thermal heat exchange fins and other surface features as well as negative features so that the thermal heat exchange fins are weight neutral. The design of the thermal heat exchange fins can be informed by a first heat map of the component which illustrates where the component is exposed to the highest temperatures during additive manufacturing (i.e., powder bed fusion or LBF-LB processes) and thus needs the most heat exchange capability to dissipate the heat generated during additive manufacturing and by a second heat map of the component which illustrates where the component is exposed to the highest temperatures during operational use and thus needs the most heat exchange capability to dissipate the heat generated during operational use. The thermal heat exchange fins can be configured to form channels to direct oil to targeted areas for increased cooling capability.

Figure 2:
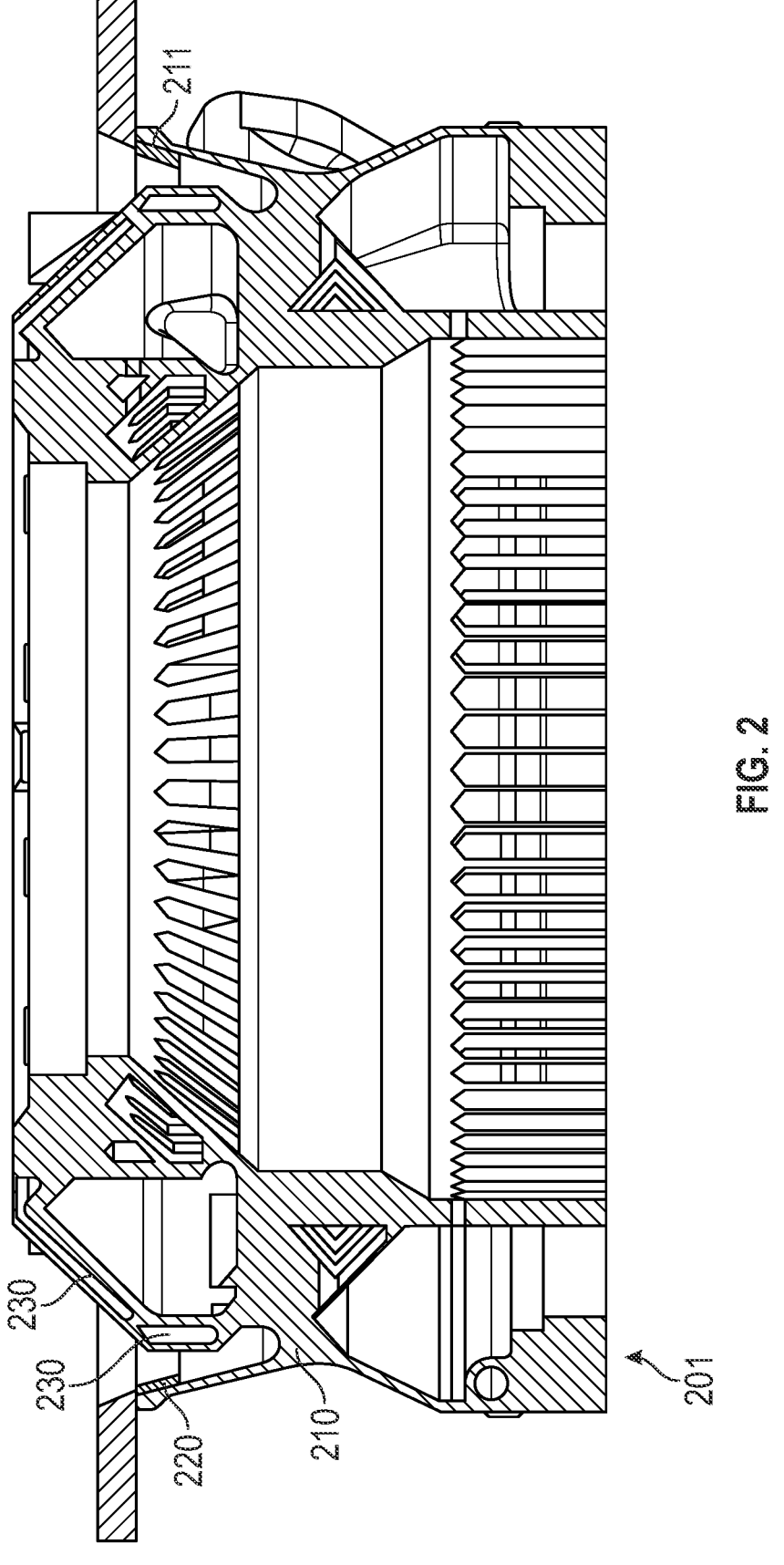
FIG. 2 is a side view of a bearing chamber with thermal heat exchange fins in accordance with embodiments.
Figure 3:
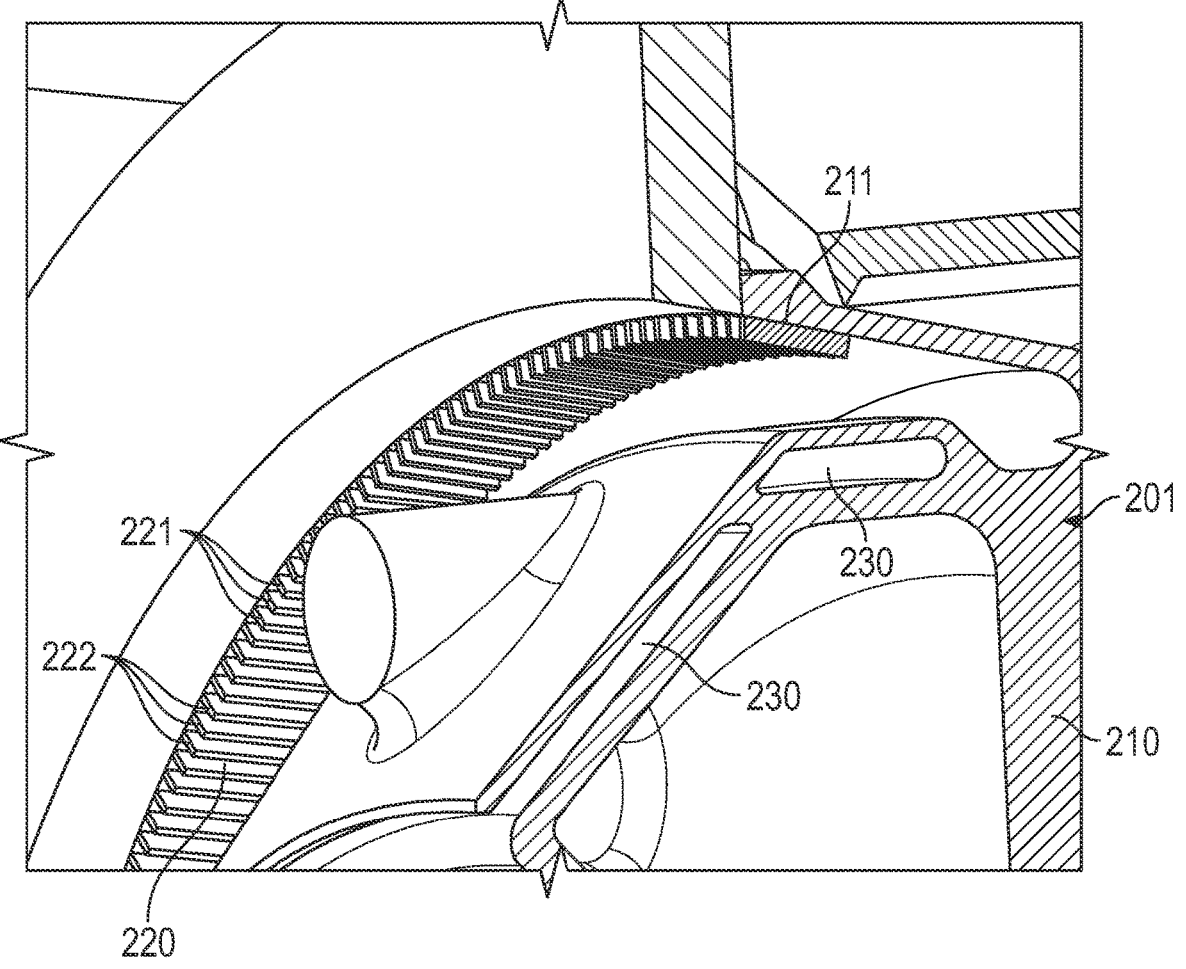
FIG. 3 is a perspective view of an enlarged portion of the bearing chamber and the thermal heat exchange fins in accordance with embodiments.

With continued reference to FIG. 1 and with additional reference to FIGS. 2 and 3, a bearing chamber 201 is provided and includes an additively manufactured bearing chamber body 210 and heat exchange fins 220. The heat exchange fins 220 are additively manufactured and integrally formed with a surface 211 of the bearing chamber body 210 and serve to reduce at least first and second thermal effects the bearing chamber 201 is expected to experience during a lifetime thereof (i.e., during additive manufacturing of the bearing chamber body 210, the heat exchange fins 220 and any external part, such as a build plate, which is additively manufactured in support of the bearing chamber body 210 or during both additive manufacturing and operational use, where operational use can include gas turbine engine operations and maintenance or service operations). In accordance with embodiments, the heat exchange fins 220 can be provided as an array of surface features 221 that are integrally built on the surface 211 of the bearing chamber body 210. In some cases, the heat exchange fins 220 can be arranged to form surface features or channels 222 that are configured to channel fluid, such as oil, therein. As such, the heat exchange fins 220 and the channels 222 can serve to promote heat exchange relative to and cooling of the bearing chamber body 210. The bearing chamber body 210 is further formed to define one or more weight reduction cavities 230 for weight-neutralizing the heat exchange fins 220.

It is to be understood that, while the heat exchange fins 220 are integrally built on the surface 211, the heat exchange fins 220 can be wholly or partially removed from the surface 211 for various reasons. For example, the heat exchange fins 220 can be wholly or partially removed following completion of the additive manufacturing of the bearing chamber 201 if their presence is deemed no longer useful.

With reference to FIG. 4, a method 400 of additively manufacturing a component, such as the bearing chamber body 210, is provided. As shown in FIG. 4, the method 400 includes generating a three-dimensional (3D) model of the component (hereinafter referred to as the "bearing chamber body 210") at block 401, generating a heat map of the 3D model which is illustrative of thermal effects the bearing chamber body 210 is expected to experience during additive manufacturing and operational use at block 402, updating the 3D model to include 3D heat exchange fin models for reducing the thermal effects at block 403 and updating the 3D model with the 3D heat exchange fin models to include 3D weight reduction cavity models for weight-neutralizing the 3D heat exchange fin models at block 404.

In accordance with embodiments, thermal effects the bearing chamber body 210 is expected to experience during additive manufacturing of the bearing chamber body 210 can include, but are not limited to, thermal effects associated with additive manufacturing of the bearing chamber body 210, the heat exchange fins 220 and any external part, such as a build plate, which is additively manufactured in support of the bearing chamber body 210. In accordance with embodiments, thermal effects the bearing chamber body 210 is expected to experience during operational use can include, but are not limited to, thermal effects associated with gas turbine engine operations and maintenance or service operations.

In accordance with embodiments, the 3D heat exchange fin models can be representative of fins integrally built on the bearing chamber body 210 (i.e., the heat exchange fins 220 of FIGS. 2 and 3). In accordance with further embodiments, the 3D heat exchange fin models can be representative of an array of surface features integrally built on the bearing chamber body 210 (i.e., to form the channels 222 of FIGS. 2 and 3).

The method 400 can further include determining whether the 3D heat exchange fin models are effective at reducing the thermal effects at block 405, refining the 3D heat exchange fin models based on a result of the determining at block 406 and repeating the determining and the refining until the determining indicates that the 3D heat exchange fin models are effective at reducing the thermal effects at block 407. In addition, the method 400 can further include determining whether the 3D weight reduction cavity models are associated with increased stresses in the bearing chamber body 210 at block 408, refining the 3D weight reduction cavity models based on a result of the determining at block 409 and repeating the determining and the refining until the determining indicates that the 3D weight reduction cavity models are not associated with increased stresses at block 410. Subsequently, the method 400 can include additively manufacturing the component according to the 3D model, the 3D heat exchange fin models and the 3D weight reduction cavity models at block 411.

Figure 5:
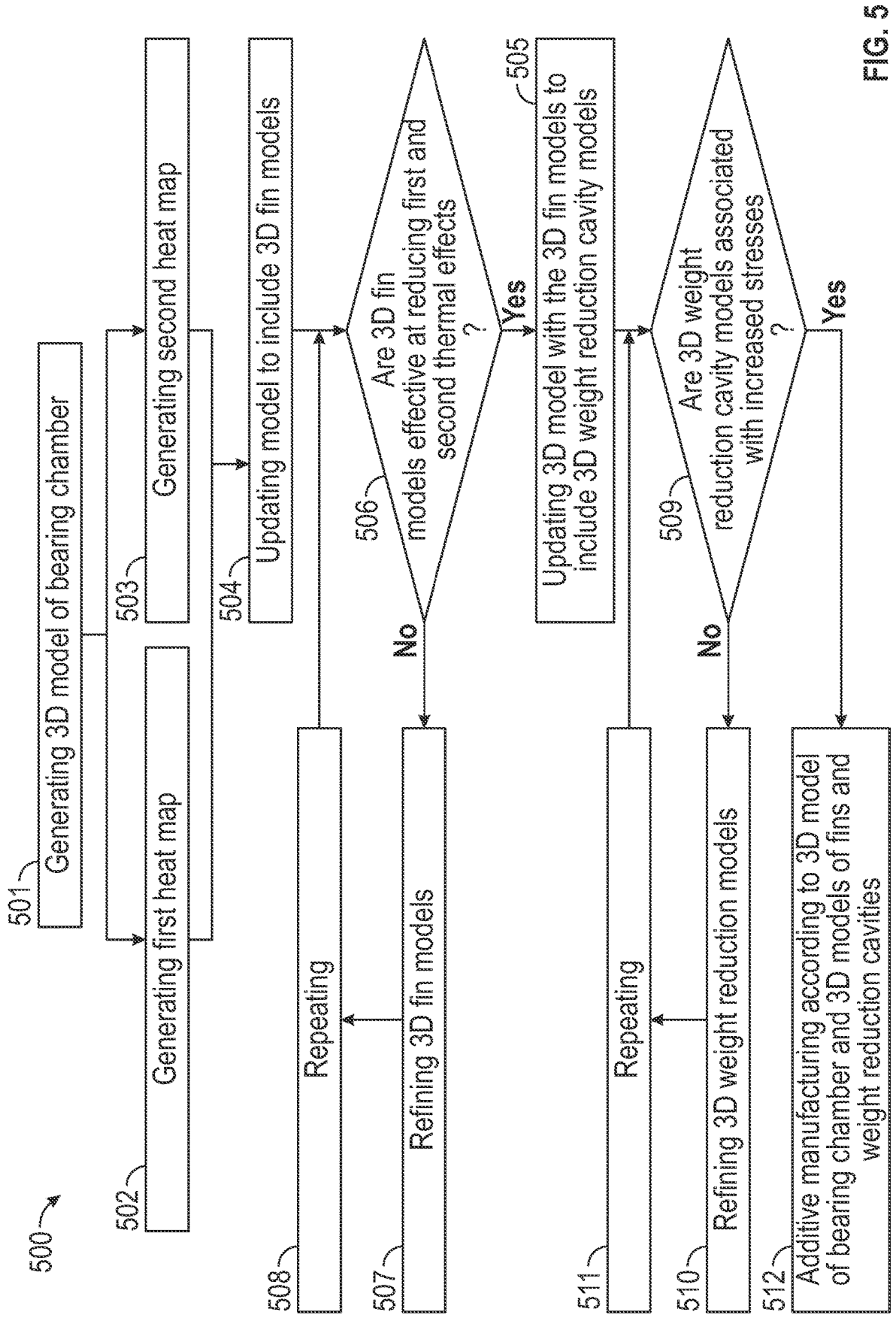
FIG. 5 is a flow diagram illustrating a method of additively manufacturing a bearing chamber in accordance with further embodiments.

With reference to FIG. 5, a method 500 of additively manufacturing a component, such as the bearing chamber body 210, is provided. As shown in FIG. 5, the method 500 includes generating a three-dimensional (3D) model of the component (hereinafter referred to as the "bearing chamber body 210") at block 501, generating a first heat map of the 3D model which is illustrative of first thermal effects the bearing chamber body 210 is expected to experience during additive manufacturing at block 502, generating a second heat map of the 3D model which is illustrative of second thermal effects the bearing chamber body 210 is expected to experience during operational use at block 503, updating the 3D model to include 3D heat exchange fin models for reducing the first and second thermal effects at block 504 and updating the 3D model with the 3D heat exchange fin models to include 3D weight reduction cavity models for weight-neutralizing the 3D heat exchange fin models at block 505.

In accordance with embodiments, the first thermal effects the bearing chamber body 210 is expected to experience during additive manufacturing of the bearing chamber body 210 can include, but are not limited to, thermal effects associated with additive manufacturing of the bearing chamber body 210, the heat exchange fins 220 and any external part, such as a build plate, which is additively manufactured in support of the bearing chamber body 210. In accordance with embodiments, the second thermal effects the bearing chamber body 210 is expected to experience during operational use can include, but are not limited to, thermal effects associated with gas turbine engine operations and maintenance or service operations.

In accordance with embodiments, the 3D heat exchange fin models can be representative of fins integrally built on the bearing chamber body 210 (i.e., the heat exchange fins 220 of FIGS. 2 and 3). In accordance with further embodiments, the 3D heat exchange fin models can be representative of an array of surface features integrally built on the bearing chamber body 210 (i.e., to form the channels 222 of FIGS. 2 and 3).

The method 500 can further include determining whether the 3D heat exchange fin models are effective at reducing the first and second thermal effects at block 506, refining the 3D heat exchange fin models based on a result of the determining at block 507 and repeating the determining and the refining until the determining indicates that the 3D heat exchange fin models are effective at reducing the first and second thermal effects at block 508. In addition, the method 500 can further include determining whether the 3D weight reduction cavity models are associated with increased stresses in the bearing chamber body 210 at block 509, refining the 3D weight reduction cavity models based on a result of the determining at block 510 and repeating the determining and the refining until the determining indicates that the 3D weight reduction cavity models are not associated with increased stresses at block 511. Subsequently, the method 500 can include additively manufacturing the component according to the 3D model, the 3D heat exchange fin models and the 3D weight reduction cavity models at block 512.

Benefits of the features described herein are the provision of a bearing chamber of a gas turbine engine. The bearing chamber is additively manufactured to include integrally formed thermal heat exchange fins and other surface features as well as negative features so that the thermal heat exchange fins are weight neutral. The design of the thermal heat exchange fins can be informed by a first heat map of the component which illustrates where the component is exposed to the highest temperatures during additive manufacturing and thus needs the most heat exchange capability to dissipate the heat generated during additive manufacturing and by a second heat map of the component which illustrates where the component is exposed to the highest temperatures during operational use and thus needs the most heat exchange capability to dissipate the heat generated during operational use. The thermal heat exchange fins can be configured to form a channel to collect oil which increases cooling capability.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of additively manufacturing a component, the method comprising:

generating a three-dimensional (3D) model of the component;

generating a first heat map of the 3D model which is illustrative of first thermal effects the component is expected to experience during additive manufacturing;

generating a second heat map of the 3D model which is illustrative of second thermal effects the component is expected to experience during operational use;

updating the 3D model to include 3D heat exchange fin models for reducing each of the first and second thermal effects;

updating the 3D model with the 3D heat exchange fin models to include 3D weight reduction cavity models for weight-neutralizing the 3D heat exchange fin models; and additively manufacturing the component according to the 3D model, the 3D heat exchange fin models and the 3D weight reduction cavity models such that the component comprises:

a body comprising a portion of the body defining weight reduction cavities;

a surface extending off the body; and heat exchange fins integrally formed with the surface to be disposed at a distance from and to face inwardly toward the portion of the body.

2. The method according to claim 1, wherein the component comprises a bearing chamber.

3. The method according to claim 1, further comprising:

determining whether the 3D heat exchange fin models are effective at reducing the first and second thermal effects;

refining the 3D heat exchange fin models based on a result of the determining; and repeating the determining and the refining until the determining indicates that the 3D heat exchange fin models are effective at reducing the first and second thermal effects.

4. The method according to claim 1, further comprising:

determining whether the 3D weight reduction cavity models are associated with an increased stress;

refining the 3D weight reduction cavity models based on a result of the determining; and repeating the determining and the refining until the determining indicates that the 3D weight reduction cavity models are not associated with the increased stress.

5. The method according to claim 1, wherein the 3D heat exchange fin models are representative of the heat exchange fins integrally built on the surface.

6. The method according to claim 1, wherein the 3D heat exchange fin models are representative of the heat exchange fins provided as an array of surface features integrally built on the surface.

7. The method according to claim 1, wherein the 3D heat exchange fin models are representative of the heat exchange fins provided as an array of surface features integrally built on the surface and configured to channel oil thereon.

8. A method of additively manufacturing a bearing chamber, the method comprising:

generating a three-dimensional (3D) model of the bearing chamber;

generating a heat map of the 3D model which is illustrative of first thermal effects the bearing chamber is expected to experience during additive manufacturing;

generating a heat map of the 3D model which is illustrative of second thermal effects the bearing chamber is expected to experience during operational use;

updating the 3D model to include 3D heat exchange fin models for reducing the first and second thermal effects;

updating the 3D model with the 3D heat exchange fin models to include 3D weight reduction cavity models for weight-neutralizing the 3D heat exchange fin models; and additively manufacturing the bearing chamber according to the 3D model, the 3D heat exchange fin models and the 3D weight reduction cavity models such that the bearing chamber comprises:

a bearing chamber body comprising a portion of the bearing chamber body defining weight reduction cavities;

a surface extending off the bearing chamber body; and heat exchange fins integrally formed with the surface to be disposed at a distance from and to face inwardly toward the portion of the bearing chamber body.

9. The method according to claim 8, further comprising:

determining whether the 3D heat exchange fin models are effective at reducing the first and second thermal effects;

refining the 3D heat exchange fin models based on a result of the determining; and repeating the determining and the refining until the determining indicates that the 3D heat exchange fin models are effective at reducing the first and second thermal effects.

10. The method according to claim 8, further comprising:

determining whether the 3D weight reduction cavity models are associated with an increased stress;

refining the 3D weight reduction cavity models based on a result of the determining; and repeating the determining and the refining until the determining indicates that the 3D weight reduction cavity models are not associated with the increased stress.

11. The method according to claim 8, wherein the 3D heat exchange fin models are representative of the heat exchange fins integrally built on the surface.

12. The method according to claim 8, wherein the 3D heat exchange fin models are representative of the heat exchange fins provided as an array of surface features integrally built on the surface.

13. The method according to claim 8, wherein the 3D heat exchange fin models are representative of the heat exchange fins provided as an array of surface features integrally built on the surface and configured to channel oil thereon.

14. A bearing chamber, comprising:

a bearing chamber body comprising a portion of the bearing chamber body defining weight reduction cavities;

a surface extending off the bearing chamber body; and heat exchange fins integrally formed with the surface to be disposed at a distance from and to face inwardly toward the portion of the bearing chamber body, the heat exchange fins being configured to reduce first thermal effects the bearing chamber is expected to experience during additive manufacturing thereof and to reduce second thermal effects the bearing chamber is expected to experience during operational use thereof, and the portion of the bearing chamber body toward which the heat exchange fins face defining the weight reduction cavities for weight-neutralizing the heat exchange fins.

15. The bearing chamber according to claim 14, wherein the heat exchange fins are provided as an array of surface features integrally built on the surface.

16. The bearing chamber according to claim 14, wherein the heat exchange fins are provided as an array of surface features integrally built on the surface and configured to channel oil thereon.

* * * * *